(12) United States Patent
Ha et al.

(10) Patent No.: US 12,107,432 B2
(45) Date of Patent: Oct. 1, 2024

(54) ELECTRONIC DEVICE AND METHOD FOR CONTROLLING OPERATION OF ELECTRONIC DEVICE

(71) Applicant: Samsung Electronics Co., Ltd., Gyeonggi-do (KR)

(72) Inventors: Mincheol Ha, Gyeonggi-do (KR); Dongzo Kim, Gyeonggi-do (KR); Kyungmin Lee, Gyeonggi-do (KR); Kihyun Kim, Gyeonggi-do (KR); Yunjeong Noh, Gyeonggi-do (KR); Keyic Son, Gyeonggi-do (KR); Taehyeon Yu, Gyeonggi-do (KR); Hyungkoo Chung, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 54 days.

(21) Appl. No.: 17/880,830

(22) Filed: Aug. 4, 2022

(65) Prior Publication Data

US 2023/0042780 A1 Feb. 9, 2023

Related U.S. Application Data

(63) Continuation of application No. PCT/KR2022/011494, filed on Aug. 3, 2022.

(30) Foreign Application Priority Data

Aug. 4, 2021 (KR) ........................ 10-2021-0102631

(51) Int. Cl.
*H02J 50/10* (2016.01)
*H02J 50/40* (2016.01)
*H02J 50/80* (2016.01)

(52) U.S. Cl.
CPC ............ *H02J 50/10* (2016.02); *H02J 50/402* (2020.01); *H02J 50/80* (2016.02)

(58) Field of Classification Search
CPC ........... H02J 50/10; H02J 50/80; H02J 50/402
(Continued)

(56) References Cited

U.S. PATENT DOCUMENTS 10,771,113 B2 9/2020 Konanur et al.
10,855,099 B2 12/2020 Kim et al.
(Continued)

FOREIGN PATENT DOCUMENTS

KR 10-2012-0132406 A 12/2012
KR 10-2015-0051922 A 5/2015
(Continued)

OTHER PUBLICATIONS

International Search Report dated Nov. 11, 2022.

*Primary Examiner* — Alfonso Perez Borroto
(74) *Attorney, Agent, or Firm* — Cha & Reiter, LLC

(57) ABSTRACT

Disclosed is a method for controlling an electronic device electrically couplable to an external electronic device through a connector and capable of transmitting/receiving wireless power, the method including: an operation of identifying electrical connection to the external electronic device; an operation of receiving power from the external electronic device through a short-range communication module; an operation of controlling a mode switch module based on the received power and transmitting a signal regarding a power transmission mode to the external electronic device through the connector; an operation of receiving direct-current power from the external electronic device through the connector after transmitting the signal regarding the power transmission mode; and an operation of generating an electromagnetic field for wireless power transmission (Continued)

through the wireless power transmission/reception module, based on the received direct-current power.

21 Claims, 9 Drawing Sheets

(58) Field of Classification Search
USPC .......................................................... 307/104
See application file for complete search history.

(56) References Cited

U.S. PATENT DOCUMENTS

| | | |
|---|---|---|
| 11,509,173 B2 | 11/2022 | Chung et al. |
| 2012/0049647 A1* | 3/2012 | Kim ........................ H02J 50/12 |
| | | 307/104 |
| 2012/0299390 A1 | 11/2012 | Kim et al. |
| 2013/0267170 A1 | 10/2013 | Chong et al. |
| 2014/0021909 A1 | 1/2014 | Klawon et al. |
| 2014/0347006 A1* | 11/2014 | Kim ........................ H02J 50/90 |
| | | 320/108 |
| 2016/0099579 A1* | 4/2016 | Kim .......................... H02J 7/02 |
| | | 307/104 |
| 2016/0156387 A1 | 6/2016 | Ota |
| 2017/0063139 A1* | 3/2017 | Chang ..................... H02J 50/12 |
| 2017/0110898 A1 | 4/2017 | Kyriakoulis et al. |
| 2017/0117743 A1* | 4/2017 | Kim ........................ H02J 50/12 |
| 2018/0083486 A1* | 3/2018 | Choi ....................... H02J 50/12 |
| 2018/0109140 A1 | 4/2018 | Rothschild |
| 2018/0359343 A1 | 12/2018 | Lee et al. |
| 2019/0173321 A1* | 6/2019 | Kim ........................ G01R 27/04 |
| 2020/0204003 A1 | 6/2020 | Lee et al. |

FOREIGN PATENT DOCUMENTS

| | | |
|---|---|---|
| KR | 10-1580518 B1 | 12/2015 |
| KR | 10-2017-0076435 A | 7/2017 |
| KR | 10-2020-0056619 A | 5/2020 |
| KR | 10-2021-0027870 A | 3/2021 |

* cited by examiner

ELECTRONIC DEVICE AND METHOD FOR CONTROLLING OPERATION OF ELECTRONIC DEVICE

CROSS-REFERENCE TO RELATED APPLICATION(S)

This application is a continuation of International Application No. PCT/KR2022/011494, which was filed on Aug. 3, 2022, and claims priority to Korean Patent Application No. 10-2021-0102631, filed on Aug. 4, 2021, in the Korean Intellectual Property Office, the disclosure of which are incorporated by reference herein their entirety.

BACKGROUND

Technical Field

One or more embodiments of the instant disclosure generally relate to an electronic device and a method for controlling one or more operations of the electronic device.

Description of Related Art

Wireless power transmission technology may be used to wirelessly transfer power from a power transmitter to a power receiver to charge the battery of the power receiver. As noted, this is done wirelessly, and thus the power receiver and the power transmitter need not be physically connected via a cable or wire. Wireless power transmission technologies may use various different types of physical phenomena to transfer power, such as magnetic induction or magnetic resonance.

An electronic device (for example, a cover capable of wirelessly transmitting/receiving power) may electrically connect to an external electronic device (for example, smartphone) and may provide power to the external electronic device either wirelessly or via a wire.

SUMMARY

When wireless power is transmitted by using an electronic device (for example, cover capable of wirelessly transmitting/receiving power) having wired connection with an external electronic device (for example, smartphone) supporting no wireless power transmission/reception function, there may be difficulty in applying power to the electronic device (for example, the cover capable of wirelessly transmitting/receiving power).

A method for controlling an electronic device electrically couplable to an external electronic device through a connector and capable of transmitting/receiving wireless power according to an embodiment may include: identifying electrical connection to the external electronic device; receiving power from the external electronic device through a short-range communication module; controlling a mode switch module based on the received power and transmitting a signal regarding a power transmission mode to the external electronic device through the connector; receiving direct-current power from the external electronic device through the connector after transmitting the signal regarding the power transmission mode; and generating an electromagnetic field for wireless power transmission through a wireless power transmission/reception module, based on the received direct-current power.

An electronic device electrically couplable to an external electronic device through a connector and capable of transmitting/receiving wireless power according to an embodiment may include: a shielding pad; a wireless power transmission/reception module; a short-range communication module; a first antenna of the wireless power transmission/reception module, the first antenna being disposed on a first surface of the shielding pad; a second antenna of the short-range communication module, the second antenna being disposed on a second surface of the shielding pad; and a mode switch module, wherein the wireless power transmission/reception module is electrically connected to the short-range communication module, the mode switch module, and the external electronic device, and includes the first antenna; and a wireless power transmission/reception control circuit, and wherein the wireless power transmission/reception control circuit is configured to identify electrical connection with the external electronic device, receive power from the external electronic device through the short-range communication module, control the mode switch module based on the received power and transmit a signal regarding a power transmission mode to the external electronic device through the connector, receive direct-current power from the external electronic device through the connector after transmitting the signal regarding the power transmission mode, and generate an electromagnetic field for wireless power transmission through the wireless power transmission/reception module, based on the received direct-current power.

A method for controlling an external electronic device of an electronic device electrically couplable to the external electronic device through a connector, the external electronic device capable of transmitting/receiving power wirelessly according to an embodiment may include: identifying electrical connection with the external electronic device through a connector receiver connected to the connector; receiving an input for power transmission mode conversion of the external electronic device; when receiving the input for power transmission mode conversion, determining whether battery capacity is greater than or equal to a predetermined level; when the battery capacity of a battery is greater than or equal to a predetermined level, transmitting a signal regarding power transmission mode conversion to the external electronic device through a short-range communication module; determining whether a signal regarding a power transmission mode is received from the external electronic device; when the signal regarding the power transmission mode is received, transmitting direct-current power to the external electronic device through the connector receiver connected to the connector; determining whether a time period during which the direct-current power is transmitted to the external electronic device exceeds a predetermined time period; when the time period during which the direct-current power is transmitted to the external electronic device exceeds the predetermined time period, determining whether the external electronic device transmits wireless power; and when it is determined that the external electronic device transmits wireless power, continuing transmitting the direct-current power to the external electronic device.

An electronic device according to an embodiment may include: a battery; a short-range wireless communication module; a display module; and a processor, wherein the processor is configured to identify electrical connection with an external electronic device through a connector receiver connected to a connector, receive an input for power transmission mode conversion of the external electronic device, determine whether battery capacity is greater than or equal to a predetermined level when the input for power transmission mode conversion is received, transmit a signal regarding power transmission mode conversion to the external electronic device through a short-range communication module when the battery capacity is greater than or equal to the predetermined level, determine whether a signal regarding a power transmission mode is received from the external electronic device, transmit direct-current power to the external electronic device through the connector receiver connected to the connector when the signal regarding the power transmission mode is received, determine whether a time period during which direct-current power is transmitted to the external electronic device exceeds a predetermined time period, determine whether the external electronic device transmits wireless power when the time period during which the direct-current power is transmitted to the external electronic device exceeds the predetermined time period, and continue to transmit the direct-current power to the external electronic device when it is determined that the external electronic device transmits wireless power.

Additional aspects will be set forth in part in the description which follows and, in part, will be apparent from the description, or may be learned by practice of the presented embodiments.

BRIEF DESCRIPTION OF THE DRAWINGS

In connection with the description of the drawings, like or similar reference numerals may be used for like or similar elements.

The above and other aspects, features, and advantages of certain embodiments of the present disclosure will be more apparent from the following description taken in conjunction with the accompanying drawings, in which.

DETAILED DESCRIPTION

An electronic device and a method for controlling the operations of the electronic device, according to certain embodiments of the disclosure, may change the operations of the electronic device when an external electronic device performs wireless power transmission by using the electronic device.

An electronic device and a method for controlling the operations of the electronic device, according to certain embodiments of the disclosure, may change the power transmission or power reception operations of the electronic device.

Figure 1:
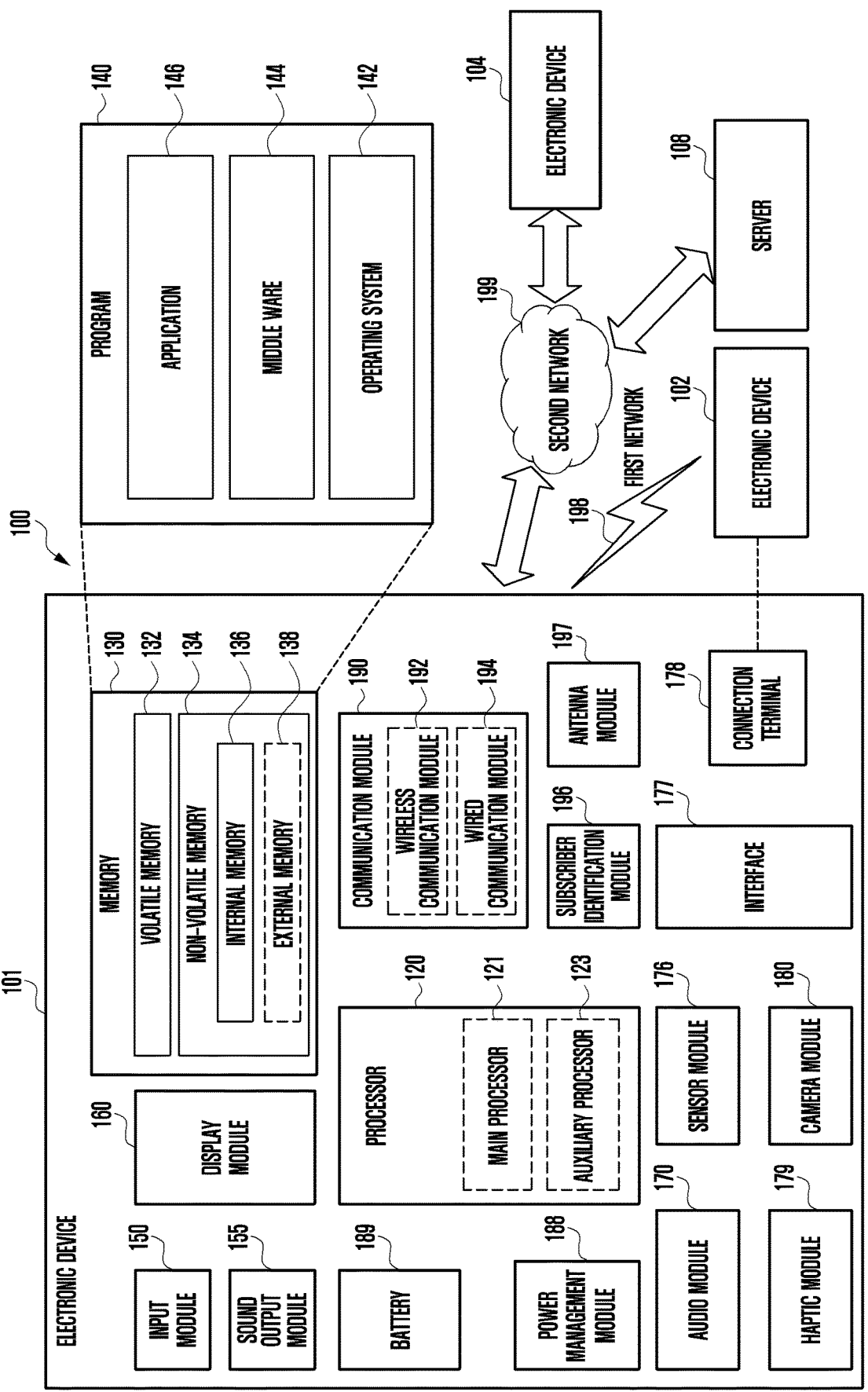
FIG. 1 is a block diagram illustrating an electronic device in a network environment according to an embodiment.

FIG. 1 is a block diagram illustrating an electronic device 101 in a network environment 100 according to an embodiment. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

Figure 2:
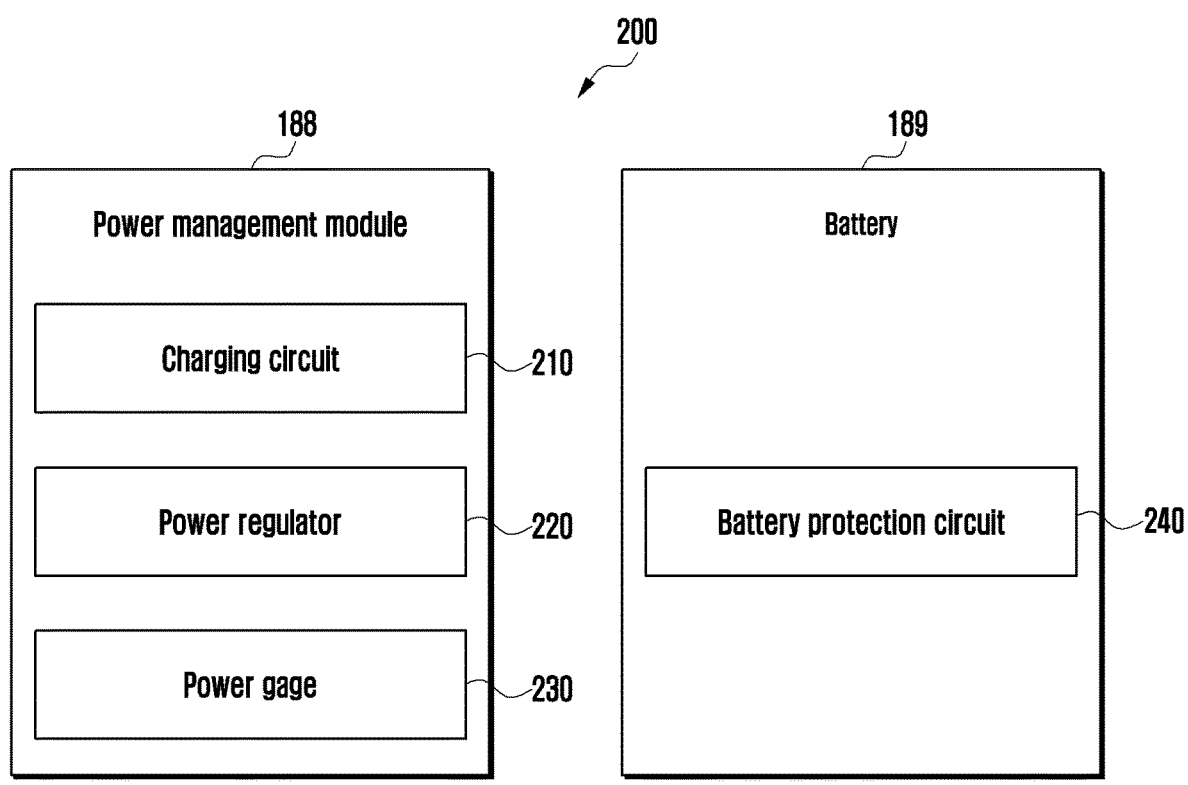
FIG. 2 is a block diagram illustrating a power management module and a battery according to an embodiment.

FIG. 2 is a block diagram 200 illustrating a power management module 188 and a battery 189 according to an embodiment.

Referring to FIG. 2, the power management module 188 may include a charging circuit 210, a power regulator 220, or a power gage 230. The charging circuit 210 may charge the battery 189 by using power supplied from an external power source of an external electronic device 101. According to an embodiment, the charging circuit 210 may select a charging scheme (for example, normal charging or quick charging) based on at least the type of the external power source (for example, whether the power source is a power adapter, a USB charger, or a wireless charger), the amount (for example, about 20 watt or more) of power that may be supplied from the external power source, and/or attributes of the battery 189. The charging circuit 210 may then charge the battery 189 by using the selected charging scheme. The external power source may be connected to the external electronic device 101, for example, via a wire through the connection terminal 178 or wirelessly through the antenna module 197.

The power regulator 220, for example, may regulate the voltage level or the current level of the power supplied from the external power source or the battery 189 so as to generate multiple power outputs having different voltage or current levels. The power regulator 220 may regulate the power of the external power source or the battery 189 to the voltage or current level suitable for various components included in the external electronic device 101. According to an embodiment, the power regulator 220 may be implemented as a low-dropout (LDO) regulator or a switching regulator. The power gage 230 may measure usage state information (for example, the capacity of the battery 189, the number of charge/discharges, voltage, or temperature) with respect to the battery 189.

The power management module 188 may determine charge state information (for example, lifespan, overvoltage, undervoltage, overcurrent, overcharge, over discharge, overheat, short-circuiting, or swelling) related to charging of the battery 189 based on at least a portion of the measured usage state information. The usage state information may be measured by using, for example, the charging circuit 210, the power regulator 220, or the power gage 230. The power management module 188 may determine whether the battery 189 is normal or abnormal, based on at least a portion of the determined charge state information. When it is determined that the state of the battery 189 is abnormal, the power management module 188 may regulate charging (for example, reduce charging voltage or current, or stop charging) with respect to the battery 189. According to an embodiment, some parts of functions of the power management module 188 may be performed by an external control device (for example, the processor 120).

According to an embodiment, the battery 189 may include a battery protection circuit (e.g. protection circuit module (PCM)) 240. The battery protection circuit 240 may perform one or more of various functions (for example, pre-blocking function) for preventing the battery 189 from performance degradation or damage by overheating or by fire. The battery protection circuit 240 may be additionally or alternatively configured as at least a part of a battery management system (BMS) capable of performing various functions including cell balancing, measuring battery capacity, measuring the number of charging/discharging, measuring temperature, or measuring voltage.

According to an embodiment, at least a portion of the usage state information or the charging state information of the battery 189 may be measured by using a corresponding sensor (for example, temperature sensor) of the sensor module 176, the power gage 230, or the power management module 188. According to an embodiment, the corresponding sensor (for example, temperature sensor) of the sensor module 176 may be included as a portion of the battery protection circuit 240, or may be disposed near the battery 189 as a separate device.

Figure 3:
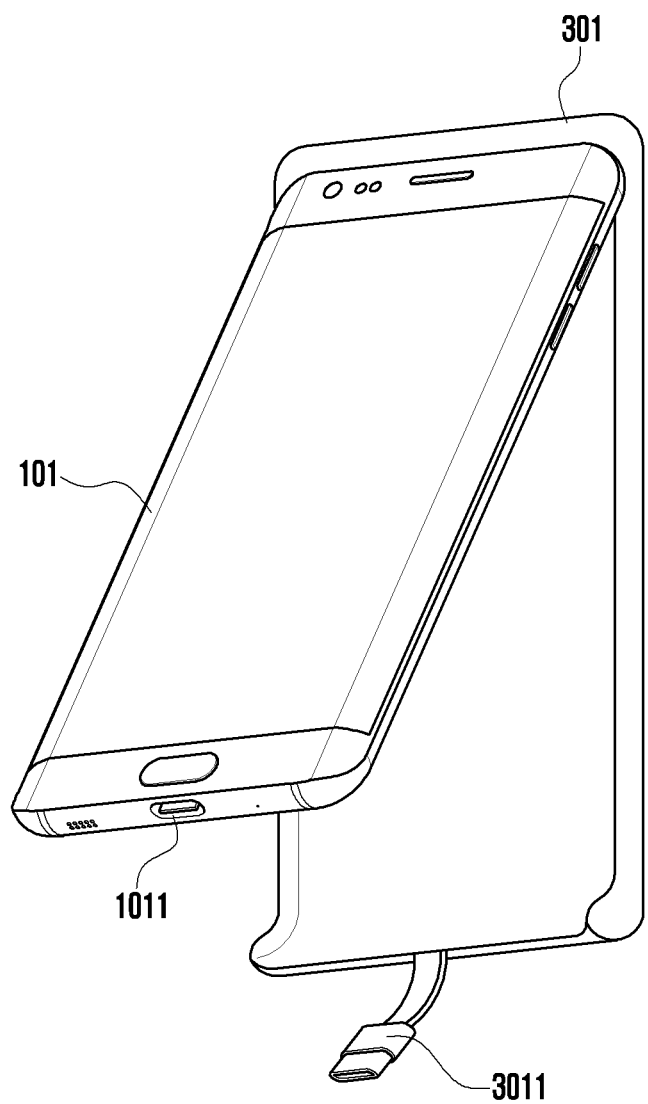
FIG. 3 is a view illustrating an electronic device and an external electronic device according to an embodiment of the disclosure.

FIG. 3 is a view illustrating an electronic device 301 and an external electronic device 101 according to an embodiment of the disclosure.

In an embodiment, the external electronic device 101 may be, for example, a tablet PC or a smartphone.

In an embodiment, the electronic device 301 may be a cover couplable to the housing of the external electronic device 101. For example, the electronic device 301 may be mechanically or physically coupled to at least a portion of the housing of the external electronic device 101. For example, the electronic device 301 may be coupled to the external electronic device 101 while not covering the display module 160 of the external electronic device 101.

In an embodiment, the external electronic device 101 and the electronic device 301 may be electrically connected to each other. The external electronic device 101 may include a connector receiver 1011. The electronic device 301 may include a connector (or a connector cable) 3011.

In an embodiment, the connector receiver 1011 and the connector 3011 may be electrically connected to each other. The external electronic device 101 may receive power from the electronic device 301 through the connector receiver 1011. The external electronic device 101 may provide or transfer power to the electronic device 301 through the connector receiver 1011. The electronic device 301 may receive power from the external electronic device 101 through the connector receiver 1011. The electronic device 301 may provide or transfer power to the external electronic device 101 through the connector receiver 1011.

In an embodiment, the external electronic device 101 may receive power from the electronic device 301 through the connector receiver 1011 to store the power in the battery 189. The external electronic device 101 may transmit the power stored in the battery 189 to the electronic device 301 through the connector receiver 1011.

In an embodiment, the external electronic device 101 and the electronic device 301 may include a short-range wireless communication module to perform wireless communication. In an embodiment, the external electronic device 101 and the electronic device 301 may include one or more coils or antennas for short-range wireless communication. In an embodiment, the external electronic device 101 and the electronic device 301 may include a near field communication (NFC) communication module and perform communication by using the NFC communication network.

Figure 4:
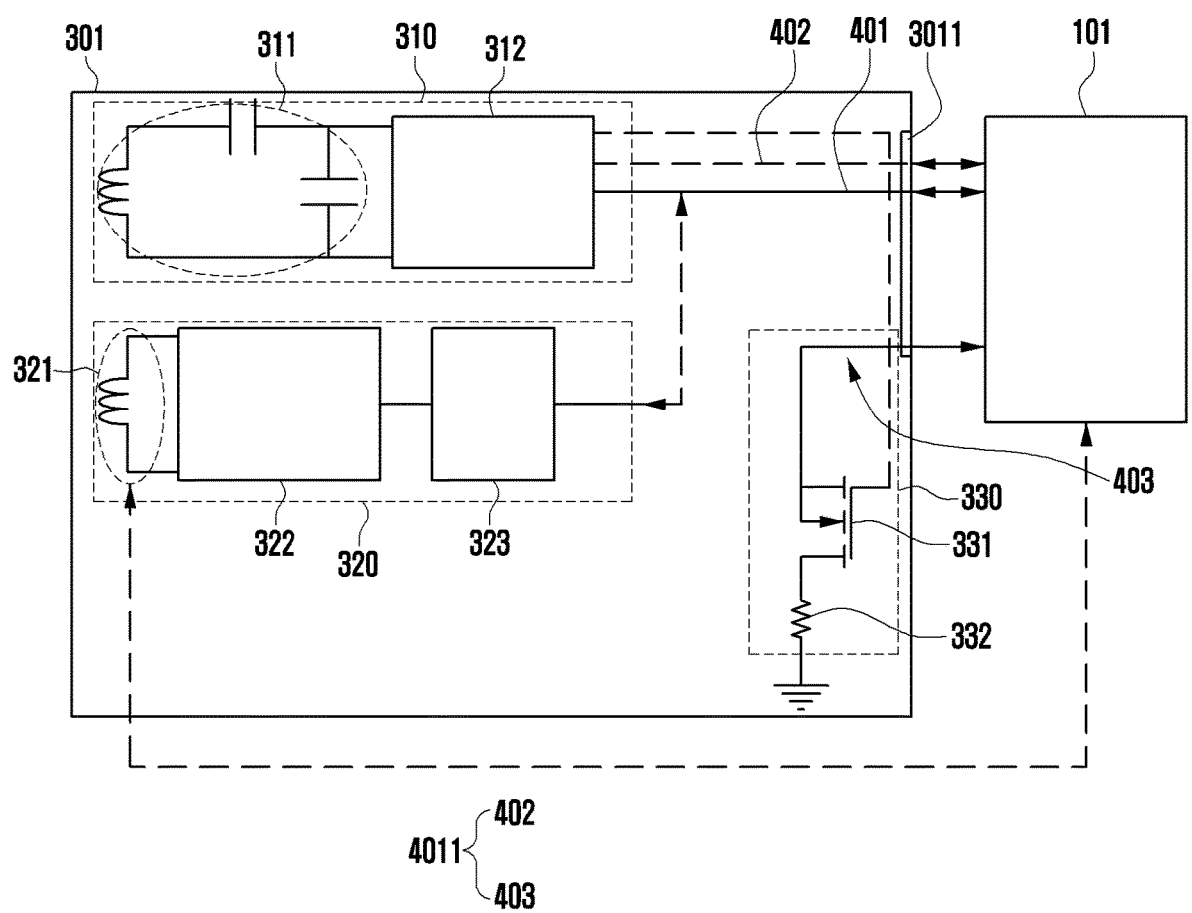
FIG. 4 is a diagram illustrating an equivalent circuit of an electronic device electrically connected to an external electronic device according to an embodiment of the disclosure.

FIG. 4 is a diagram illustrating an equivalent circuit of an electronic device 301 electrically connected to an external electronic device 101 according to an embodiment of the disclosure.

In an embodiment, the external electronic device 101 and the electronic device 301 may be electrically connected to each other by using the connector receiver 1011 and the connector 3011.

In an embodiment, the electronic device 301 may include a wireless power transmission/reception module 310, a short-range communication module 320, and a mode switch module 330.

In an embodiment, the wireless power transmission/reception module 310 may receive power from an external electronic device (for example, a wireless power transmission device) and transmit the power to the external device 101.

In an embodiment, the wireless power transmission/reception module 310 may include a wireless power transfer (WPT) coil 311 and a wireless power transmission/reception control circuit 312.

In an embodiment, the WPT coil 311 and the wireless power transmission/reception control circuit 312 may be electrically connected to each other.

In an embodiment, the WPT coil 311 may receive power in response to electrical signals in a wireless power transmission/reception frequency band. An induced current is generated on the WPT coil, based on the electromagnetic field generated on the external wireless power transmitter, and power is wirelessly received based thereon. Similarly, the WPT coil 311 may transmit power to an external electronic device (for example, a wireless power reception device) in response to electrical signals in a wireless power transmission/reception frequency band. An electromagnetic field is generated by applying an alternating current or power to the WPT coil 311 and power is wirelessly provided or transferred to an external electronic device based thereon.

In an embodiment, the wireless power transmission/reception control circuit 312 may be electrically connected to the WPT coil 311. The wireless power transmission/reception control circuit 312 may be electrically connected to the external electronic device 101 by using the connector receiver 1011 and the connector 3011. The wireless power transmission/reception control circuit 312 may be electrically connected to the short-range communication module 320. The wireless power transmission/reception control circuit 312 may be electrically connected to the mode switch module 330.

In an embodiment, the wireless power transmission/reception control circuit 312 may control power to be wirelessly transmitted or received through the WPT coil 311. In the wireless power reception mode of the external electronic device 101, the wireless power transmission/reception control circuit 312 may transmit the power received through the WPT coil 311 to the external electronic device 101. In another example, in the wireless power reception mode, the wireless power transmission/reception control circuit 312 may receive power from the external electronic device 101.

In an embodiment, the wireless power transmission/reception control circuit 312 may include a power conversion circuit (not shown), and may convert alternating current into direct-current power in the reception mode and direct-current power into alternating current in the transmission mode.

In an embodiment, the wireless power transmission/reception control circuit 312 may be electrically connected to the external electronic device 101 and the short-range communication module 320 at an input/output terminal thereof.

In an embodiment, the short-range communication module 320 may include a short-range wireless communication coil 321, a rectifier circuit 322, and a power regulator 323. The short-range communication module 320 may perform communication with an external electronic device (for example, a wireless power reception device and a wireless power transmission device) and/or the external electronic device 101 in a short-range communication frequency band by using the short-range wireless communication coil 321.

In an embodiment, the short-range communication module 320 may be a near field communication (NFC) communication module. The external electronic device 101 may include its own short-range communication module. The short-range communication module included in the external electronic device 101 may also be a near field communication (NFC) communication module.

In an embodiment, the rectifier circuit 322 may rectify signal(s) received through the short-range wireless communication coil 321. For example, the rectifier circuit 322 may convert signal(s) received through the short-range wireless communication coil 321 into direct-current power signal.

In an embodiment, the power regulator 323 may be implemented as a low-dropout (LDO) regulator or a switching regulator. The power regulator 323 may adjust the signal(s) output from the rectifier circuit 322 to stabilize the potential difference of the signal(s) and output the same.

In an embodiment, the electronic device 301 may receive power from the external electronic device 101 by using the short-range communication module 320.

In an embodiment, the external electronic device 101 may transmit power to the electronic device 301 by using the short-range communication module included in the external electronic device 101.

In an embodiment, when receiving power from the external electronic device 101 through the short-range communication module 320, the electronic device 301 may activate the wireless power transmission/reception control circuit 312 based on the received power.

In an embodiment, the external electronic device 101 may transmit a signal regarding a power transmission mode conversion to the electronic device 301 by using the short-range communication module (for example, an NFC module) included in the external electronic device 101.

In an embodiment, the electronic device 301 may receive the signal regarding the power transmission mode conversion of the electronic device 301 by using the short-range communication module 320.

In an embodiment, the electronic device 301 may be electrically connected to the external electronic device 101 through the wireless power transmission/reception module 310 or the wireless power transmission/reception control circuit 312.

In an embodiment, the external electronic device 101 may transmit the signal regarding the power transmission mode conversion to the wireless power transmission/reception module 310 or the wireless power transmission/reception control circuit 312 electrically (e.g. via a wire) connected thereto. For example, the external electronic device 101 may transmit the signal regarding the power transmission mode conversion to the wireless power transmission/reception module 310 or the wireless power transmission/reception control circuit 312 by using a signal line.

In an embodiment, the electronic device 301 may receive the signal regarding the power transmission mode conversion of the electronic device 301 from the external electronic device 101 electrically (e.g. via a wire) connected thereto. For example, the electronic device 301 may receive the signal regarding the power transmission mode conversion of the electronic device 301 by using a signal line 4011.

In an embodiment, when power is received from the external electronic device 101 through the short-range communication module 320 and the wireless power transmission/reception control circuit 312 is activated based on the received power, the electronic device 301 may receive the signal regarding the power transmission mode conversion of the electronic device 301 from the external electronic device 101 electrically (e.g. via a wire) connected thereto. For example, the electronic device 301 may receive the signal regarding the power transmission mode conversion of the electronic device 301 by using a signal line.

In an embodiment, the external electronic device 101 may transmit power to the wireless power transmission/reception module 310 or the wireless power transmission/reception control circuit 312 electrically (e.g. via a wire) connected thereto. For example, the external electronic device 101 may transmit power to the wireless power transmission/reception module 310 or the wireless power transmission/reception control circuit 312 by using a power transmission line.

In an embodiment, the electronic device 301 may receive power from the external electronic device 101 electrically (e.g. via a wire) connected thereto. For example, the electronic device 301 may receive power from the external electronic device 101 by using a power transmission line.

In an embodiment, the external electronic device 101 may transmit the signal regarding the power transmission mode conversion through the short-range communication module 320 included in the electronic device 301 or the signal line 4011 of the connector 3011 connected to the wireless power transmission/reception module 310 or the wireless power transmission/reception control circuit 312 electrically (e.g. via a wire). For example, the signal line 4011 may be a data line 402 (for example, D+, D− data line defined in the Universal Serial Bus (USB) C-type interface) or an identification line 403 (for example, a universal serial bus (USB) identification line or a configuration channel (CC) line of the USB C-type interface).

In an embodiment, the connector 3011 may include the power transmission line 401 and/or the signal line 4011. The electronic device 301 may transmit and receive power via a wire to and from the external electronic device 101 through the power transmission line 401. The electronic device 301 may transmit and receive information or data via a wire to and from the external electronic device 101 through the signal line 4011.

In an embodiment, the external electronic device 101 may transmit the signal regarding the power transmission mode conversion to the electronic device 301 and may supply power to the electronic device 301 for a determined time period by using the power transmission line.

In an embodiment, when the electronic device 301 receives the signal regarding the power transmission mode conversion and/or power from the external electronic device 101, the electronic device 301 may transmit a switching signal to the mode switch module 330 through the wireless power transmission/reception module 310.

In an embodiment, the mode switch module 330 may include a switch 331 and a load 332. For example, the switch 331 may include a MOSFET transistor, and the load 332 may be a resistor. The mode switch module 330 may allow the current or voltage of the mode switch module 330 to be changed by the switching signal.

In an embodiment, at least a portion of the mode switch module 330 is electrically connected to the external electronic device 101 so that it can transmit, to the external electronic device 101, current or voltage changed by the switching signal.

In an embodiment, the current or voltage of the mode switch module 330 is changed by the switching signal output from the wireless power transmission/reception module 310 when the wireless power transmission/reception mode of the electronic device 301 is changed.

In an embodiment, the current or voltage of the mode switch module 330 is changed by the switching signal output from the wireless power transmission/reception module 310 when the mode of the electronic device 301 is changed from a wireless power reception mode to a wireless power transmission mode.

In an embodiment, the electronic device 301 may control the mode switch module 330 to transfer a signal regarding the power transmission mode to the external electronic device 101 through the connector 3011.

When the external electronic device 101 receives the signal regarding the power transmission mode from the electronic device 301, the external electronic device 101 may operate in an OTG (on-the-go mode as defined in USB specification) mode and supply direct-current power (for example, 5 V) to the electronic device 301 through the connector 3011.

In an embodiment, the mode switch module 330 may allow the current or voltage of the mode switch module 330 to be changed by a switching signal. For example, when the switch module 330 is operated by the switching signal, the current or voltage applied to the identification line 403 may be changed.

In an embodiment, the electronic device 301 may convert the direct-current power received from the external electronic device 101 by using an inverter included in the wireless power transmission/reception module 310 to be transferred to another external electronic device (for example, a wireless power receptor) through the WPT coil 311.

In an embodiment, when the time period during which the external electronic device 101 supplies direct-current power (for example, 5 V) to the electronic device 301 through the connector 3011 exceeds a predetermined time period, the electronic device 301 may not supply power. For example, when the external electronic device 101 supplies direct-current power (for example, 5 V) to the electronic device 301, and the electronic device 301 may not transmit power to another external electronic device during the designated time period.

In an embodiment, even when the time period during which the external electronic device 101 supplies direct-current power (for example, 5 V) to the electronic device 301 through the connector 3011 exceeds a predetermined time period, power may not be otherwise supplied to the electronic device 301 (e.g. from another power transmitting device) when the electronic device 301 continuously operates in the wireless power transmission mode.

In an embodiment, when the current or voltage of the mode switch module 330 is changed by the switching signal output from the wireless power transmission/reception module 310, the mode of the electronic device 301 may be changed from the wireless power transmission mode to the wireless power reception mode.

In an embodiment, in the wireless power reception mode, the electronic device 301 may receive power from an external electronic device (for example, a wireless power transmission device) by using the WPT coil 311, and transmit power to the external electronic device 101 by wire (for example, the connector receiver 1011 and the connector 3011).

In an embodiment, in the wireless power transmission mode, the electronic device 301 may receive power from the external electronic device 101 by wire (for example, the connector receiver 1011 and the connector 3011) and transmit power to an external electronic device (for example, a wireless power reception device) by using the WPT coil 311.

Figure 5:
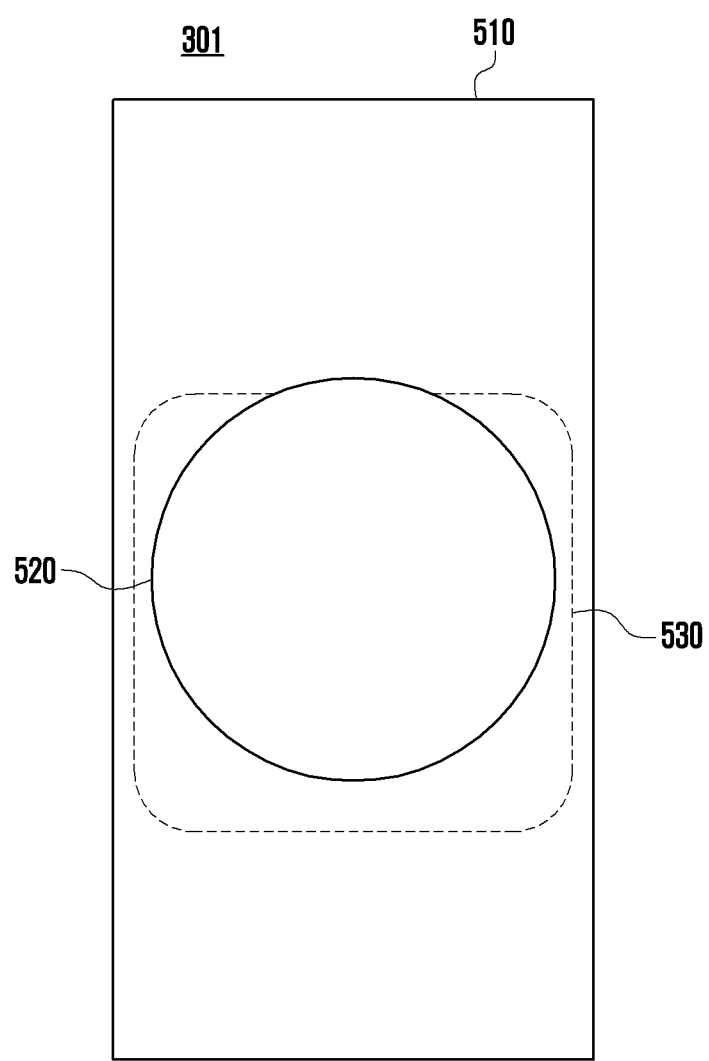
FIG. 5 is a front view of some components of an electronic device according to an embodiment of the disclosure.

FIG. 5 is a front view of some components of an electronic device 301 according to an embodiment of the disclosure.

Figure 6:
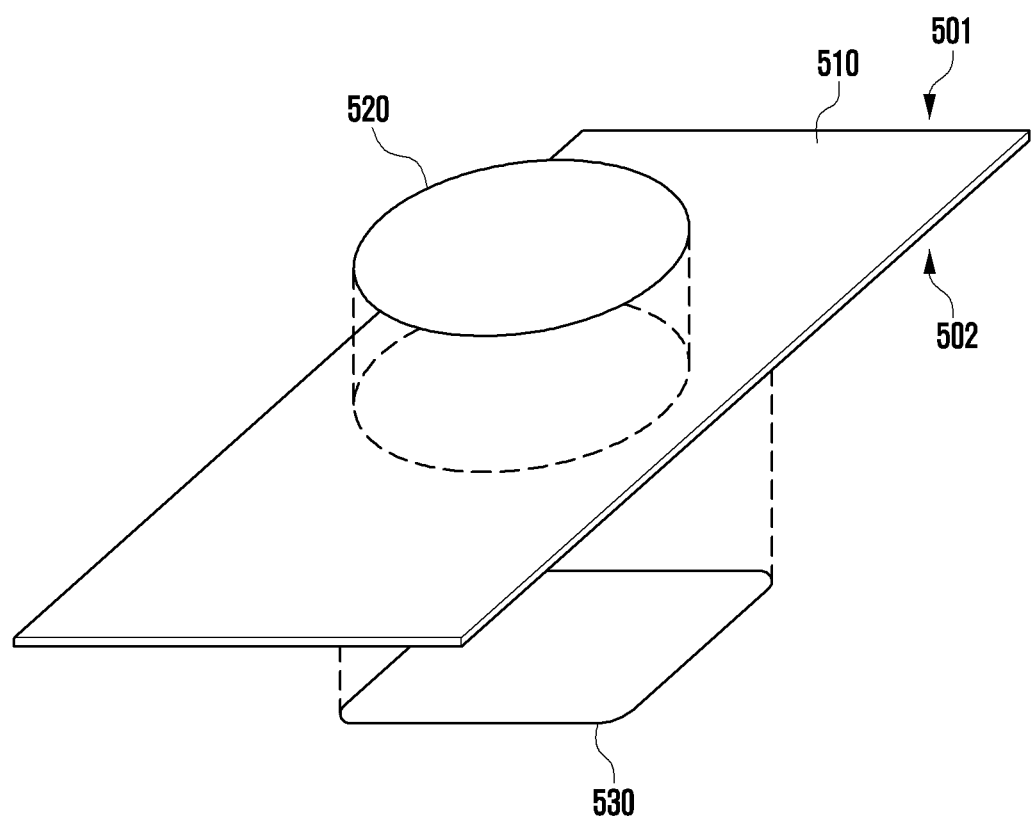
FIG. 6 is an exploded view of some components of an electronic device according to an embodiment of the disclosure.

FIG. 6 is an exploded view of some components of an electronic device 301 according to an embodiment of the disclosure.

In an embodiment, the electronic device 301 may include a first antenna module 520, a second antenna module 530, and a shielding pad 510.

In an embodiment, the shielding pad 510 may have a plate shape and include the first antenna 520 on a first surface 501 and the second antenna 530 on a second surface 502.

In an embodiment, the first antenna 520 may be the antenna of the wireless power transmission/reception module 310. In an embodiment, the second antenna 530 may be the antenna of the short-range communication module 320.

In an embodiment, the first antenna 520 may be the coil of the wireless power transmission/reception module 310. The second antenna 530 may be the coil of the short-range communication module 320.

In an embodiment, the first antenna 520 may be the WPT coil 311 of the wireless power transmission/reception module 310, and in an embodiment, the shielding pad 510 may include material capable of shielding electromagnetic waves. The shielding pad 510 may include a conductor or a ferromagnetic body. For example, the shielding pad 510 may include at least one of magnetic metal, magnetic polymer, conductive polymer, and/or carbon polymer.

In an embodiment, when the electronic device 301 is coupled to the external electronic device 101, the first surface 501 of the shielding pad 510 may face an external electronic device (for example, a wireless power transmission device and a wireless power reception device). In an embodiment, when the electronic device 301 is coupled to the external electronic device 101, the first surface 501 of the shielding pad 510 may face the outside of the external electronic device 101.

In an embodiment, when the electronic device 301 is coupled to the external electronic device 101, the second surface 502 of the shielding pad 510 may face the external electronic device 101.

In an embodiment, the shielding pad 510 may shield the first antenna 520 and the second antenna 530 from interfering with each other.

Figure 7:
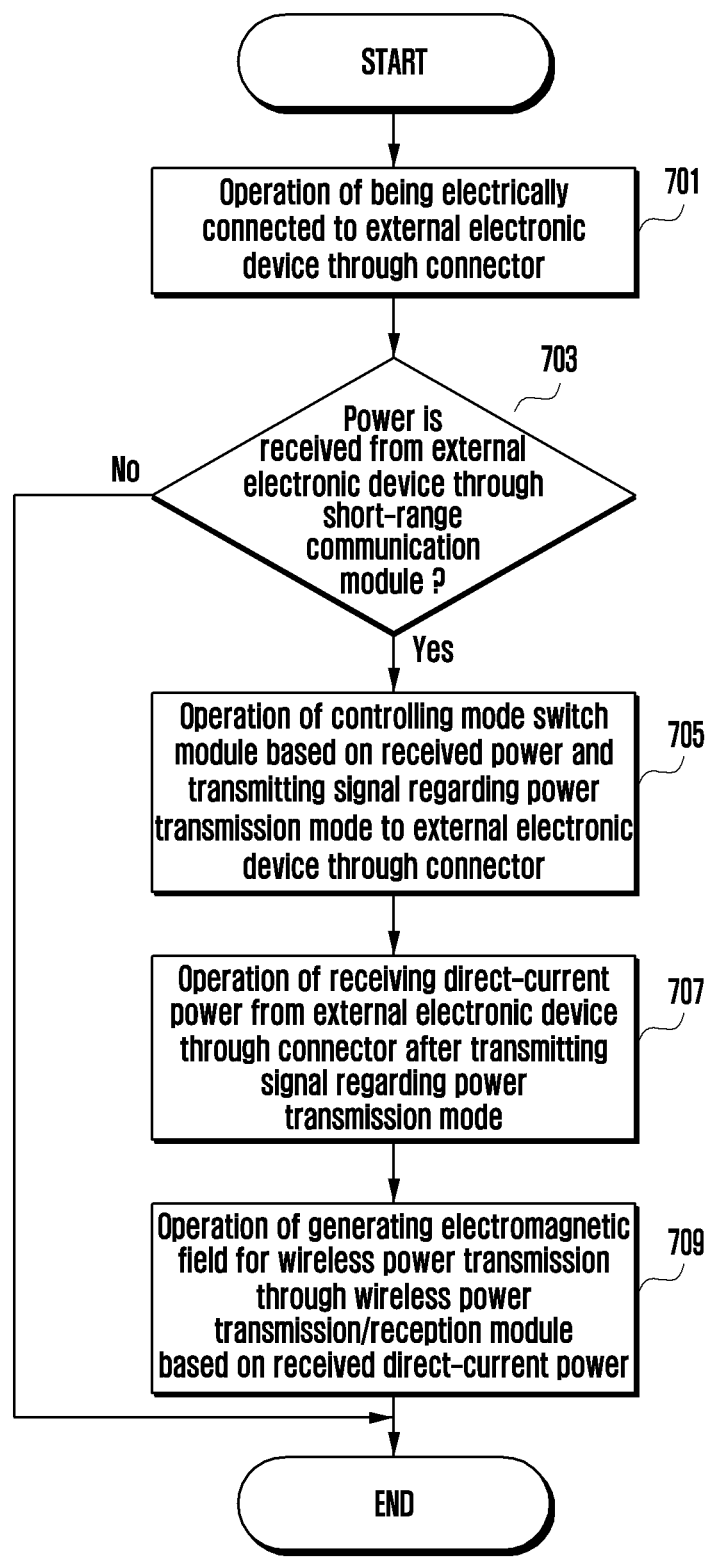
FIG. 7 is a flowchart illustrating a method for controlling an operation of an electronic device according to an embodiment of the disclosure.

FIG. 7 is a flowchart illustrating a method for controlling an operation of an electronic device 301 according to an embodiment of the disclosure.

In an embodiment, in operation 701, the electronic device 301 may be electrically connected to an external device through the connector 3011.

In operation 701, the electronic device 301 may configure, as the default, that the electronic device 301 transmits power to the external electronic device 101 when the external electronic device 101 is electrically connected. It may be configured, as the default, that the external electronic device 101 receives power from the electronic device 301 through the connector 3011 and/or a connector receiver 1011 when electrically connected to the electronic device 301.

In an embodiment, in operation 703, under the control of the wireless power transmission/reception control circuit 312, the electronic device 301 may determine whether power is received from the external electronic device 101 through the short-range communication module 320.

In an embodiment, in operation 703, under the control of the wireless power transmission/reception control circuit 312, the electronic device 301 may determine whether a signal regarding power transmission mode conversion is received from the external electronic device 101 through the short-range communication module 320.

In an embodiment, when the external electronic device 101 receives power through the short-range communication module 320, the electronic device 301 may proceed from operation 703 to operation 705, under the control of the wireless power transmission/reception control circuit 312.

In an embodiment, the power transmitted to the electronic device 301 through the short-range communication module 320 may have a predetermined voltage. The electronic device 301 may activate the wireless power transmission/reception control circuit 312 by using the received power through the short-range communication module 320.

In an embodiment, when the signal regarding power transmission mode conversion is not received from the external electronic device 101 through the short-range communication module 320, the electronic device 301 may proceed from operation 703 to END operation, under the control of the wireless power transmission/reception control circuit 312.

In an embodiment, when the signal regarding power transmission mode conversion is not received from the external electronic device 101 through the short-range communication module 320, the electronic device may be operated in the default mode in which the electronic device 301 transmits power to the external electronic device 101.

In an embodiment, alternatively, in operation 703, under the control of the wireless power transmission/reception control circuit 312, the electronic device 301 may determine, whether the signal regarding power transmission mode conversion is received from the external electronic device 101 through the signal line 4011.

For example, the signal line 4011 may be a data line 402 (for example, the D+, D− data line defined in the Universal Serial Bus (USB) C-type interface) or an identification line 403 (for example, Universal Serial Bus (USB) identification line or configuration channel (CC) line of the USB C-type interface).

In an embodiment, when the signal regarding power transmission mode conversion is received from the external electronic device 101 through the signal line 4011, the electronic device 301 may proceed from operation 703 to operation 705, under the control of the wireless power transmission/reception control circuit 312.

In an embodiment, when the signal regarding power transmission mode conversion is not received from the external electronic device 101 through the signal line 4011, the electronic device 301 may proceed from operation 703 to END operation, under the control of the wireless power transmission/reception control circuit 312.

In an embodiment, the signal regarding power transmission mode conversion may be a command or a power signal to cause the electronic device 301 to be converted into the wireless power transmission mode.

In an embodiment, in operation 705, under the control of the wireless power transmission/reception control circuit 312, the electronic device 301 may control the mode switch module 330 based on the signal regarding power transmission mode conversion, and transmit a signal regarding a power transmission mode to the external electronic device 101 through the connector 3011.

In an embodiment, in operation 705, under the control of the wireless power transmission/reception control circuit 312, when the current or voltage of the mode switch module 330 is changed based on the signal regarding a power transmission mode conversion, the electronic device 301 may transmit a signal regarding a power transmission mode to the external electronic device 101 through the identification line 403 of the connector 3011.

In an embodiment, in operation 705, under the control of the wireless power transmission/reception control circuit 312, the electronic device 301 may determine the wireless power transmission mode, control the current or voltage of the mode switch module 330 to be changed, and transmit a signal regarding a power transmission mode to the external electronic device 101.

The signal regarding a power transmission mode may be a signal configured to notify the external electronic device 101 to supply power by using the power transmission line 401 of the connector 3011 such that the electronic device 301 may operate in the wireless power transmission mode. The signal regarding a power transmission mode may be a signal configured to indicate that the electronic device 301 has entered the wireless power transmission mode.

In an embodiment, when the signal regarding a power transmission mode is received from the electronic device 301, the external electronic device 101 may operate in an on-the-go (OTG) mode.

In an embodiment, in operation 707, under the control of the wireless power transmission/reception control circuit 312, the electronic device 301 may receive direct-current power (for example, 5 V direct-current power) from the external electronic device 101 through the connector 3011 after transmitting the signal regarding the power transmission mode to the external electronic device 101.

In an embodiment, when the external electronic device 101 receives the signal regarding the power transmission mode from the electronic device 301, the external electronic device 101 may supply direct-current power (for example, 5 V) to the electronic device 301 through the connector 3011.

In an embodiment, in operation 709, under the control of the wireless power transmission/reception control circuit 312, the electronic device 301 may generate an electromagnetic field for wireless power transmission through the wireless power transmission/reception module 310, based on the received direct-current power.

In an embodiment, in operation 709, under the control of the wireless power transmission/reception control circuit 312, the electronic device 301 may convert the direct-current power received from the external electronic device 101 by using an inverter included in the wireless power transmission/reception module 310 to be transferred to another external electronic device (for example, a wireless power receptor) through the WPT coil 311.

Figure 8:
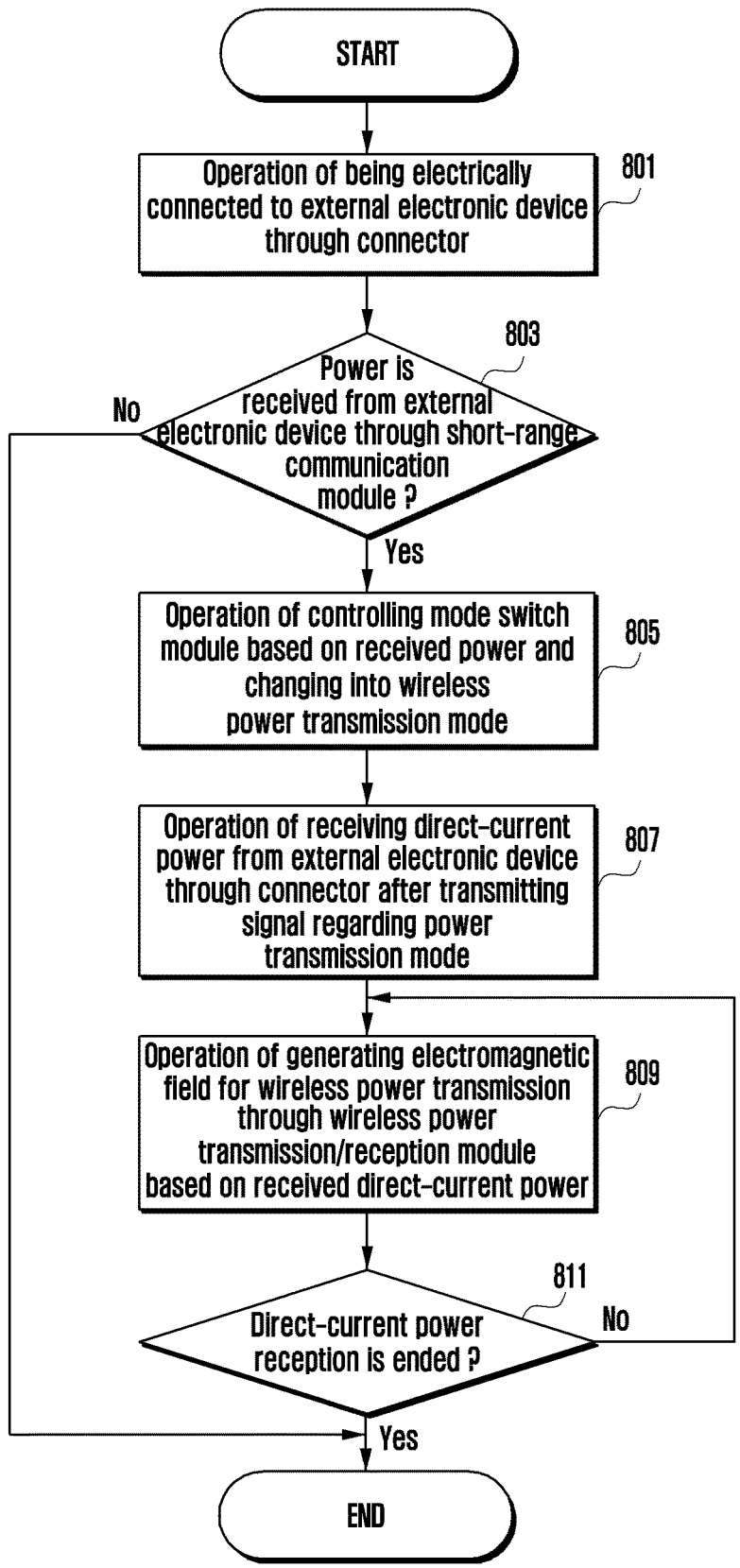
FIG. 8 is a flowchart illustrating a method for controlling an operation of an electronic device according to an embodiment of the disclosure.

FIG. 8 is a flowchart illustrating a method for controlling an operation of an electronic device 301 according to an embodiment of the disclosure.

In an embodiment, in operation 801, the electronic device 301 may be electrically connected to an external electronic device through the connector 3011.

In operation 801, the electronic device 301 may configure, as the default, that the electronic device 301 transmits power to the external electronic device 101 when the external electronic device 101 is electrically connected. It may be configured, as the default, that the external electronic device 101 receives power from the electronic device 301 through the connector 3011 and/or the connector receiver 1011 when electrically connected to the electronic device 301.

In an embodiment, in operation 803, under the control of the wireless power transmission/reception control circuit 312, the electronic device 301 may activate the wireless power transmission/reception control circuit 312 when receiving power from the external electronic device 101 through the short-range communication module 320 or the connector 3011.

In an embodiment, in operation 803, under the control of the wireless power transmission/reception control circuit 312, the electronic device 301 may determine whether power is received from the external electronic device 101 through the short-range communication module 320.

In an embodiment, in operation 803, under the control of the wireless power transmission/reception control circuit 312, the electronic device 301 may determine whether a signal regarding power transmission mode conversion is received from the external electronic device 101 through the short-range communication module 320.

In an embodiment, in operation 803, under the control of the wireless power transmission/reception control circuit 312, the electronic device 301 may determine, whether the signal regarding power transmission mode conversion is received from the external electronic device 101 through the signal line 4011.

For example, the signal line 4011 may be a data line 402 (for example, D+, D− data line defined in the Universal Serial Bus (USB) C-type interface) or an identification line 403 (for example, Universal Serial Bus (USB) identification line or configuration channel (CC) line of the USB C-type interface).

In an embodiment, when power is received from the external electronic device 101 through the short-range communication module 320, the electronic device 301 may proceed from operation 803 to operation 805, under the control of the wireless power transmission/reception control circuit 312.

In an embodiment, when the signal regarding power transmission mode conversion is received from the external electronic device 101 through the short-range communication module 320, the electronic device 301 may proceed from operation 803 to operation 805, under the control of the wireless power transmission/reception control circuit 312.

In an embodiment, when the signal regarding power transmission mode conversion is received from the external electronic device 101 through the signal line 4011, the electronic device 301 may proceed from operation 803 to operation 805, under the control of the wireless power transmission/reception control circuit 312.

In an embodiment, when power is not received from the external electronic device 101 through the short-range communication module 320, the electronic device 301 may proceed from operation 803 to END operation, under the control of the wireless power transmission/reception control circuit 312.

In an embodiment, when the signal regarding power transmission mode conversion is not received from the external electronic device 101 through the short-range communication module 320, the electronic device 301 may proceed from operation 803 to END operation, under the control of the wireless power transmission/reception control circuit 312.

In an embodiment, when the signal regarding power transmission mode conversion is not received from the external electronic device 101 through the signal line 4011, the electronic device 301 may proceed from operation 803 to END operation, under the control of the wireless power transmission/reception control circuit 312.

In an embodiment, the signal regarding power transmission mode conversion may be a command or a power signal to cause the electronic device 301 to be operated in the wireless charging transmission mode.

In an embodiment, in operation 805, the electronic device 301 may control the mode switch module 330 and the mode thereof may be changed from the wireless power reception mode to the wireless power transmission mode, based on the power received through the short-range communication module 320, under the control of the transmission/reception control circuit 312.

In an embodiment, in operation 805, under the control of the wireless power transmission/reception control circuit 312, the electronic device 301 may change the current or voltage of the mode switch module 330 based on the signal regarding power transmission mode conversion, and the mode thereof may be changed from the wireless power reception mode to the wireless power transmission mode.

In an embodiment, in operation 805, under the control of the wireless power transmission/reception control circuit 312, the electronic device 301 may change the current or voltage of the mode switch module 330, and transmit the signal regarding the power transmission mode to the external electronic device 101 through the connector 3011.

In an embodiment, when receiving the signal regarding power transmission mode conversion, in operation 805, under the control of the wireless power transmission/reception control circuit 312, the electronic device 301 may transmit the switching signal to the mode switch module 330 such that the current or voltage of the mode switch module 330 may be changed. The current or voltage of the mode switch module 330 is changed, and in operation 805, under the control of the wireless power transmission/reception control circuit 312, the electronic device 301 may determine that it is in the wireless power transmission mode, and transmit a signal regarding a power transmission mode to the external electronic device 101. The signal regarding the power transmission mode may be a signal configured to notify the external electronic device 101 to supply power by using the power transmission line 401 of the connector 3011 such that the electronic device 301 may operate in the wireless power transmission mode. The signal regarding the power transmission mode may be a signal configured to indicate that the electronic device 301 has entered the wireless power transmission mode.

In an embodiment, when receiving a signal regarding power transmission mode conversion, in operation 805, under the control of the wireless power transmission/reception control circuit 312, the electronic device 301 may transmit the switching signal to the mode switch module 330 such that the current or voltage of the mode switch module 330 may be changed. The current or voltage of the mode switch module 330 is changed, and in operation 805, under the control of the wireless power transmission/reception control circuit 312, the electronic device 301 may determine that it is in the wireless charging transmission mode, and transmit the signal regarding the power transmission mode to the external electronic device 101. For example, the signal regarding the power transmission mode may be a signal configured to cause the external electronic device 101 to be operated in the OTG mode. According to another embodiment, the signal regarding a power transmission mode may be a signal configured to indicate that the mode of the electronic device 301 is changed from the wireless power reception mode to the wireless power transmission mode.

In an embodiment, in operation 807, under the control of the wireless power transmission/reception control circuit 312, the electronic device 301 may receive direct-current power (for example, 5 V direct-current power) from the external electronic device 101 through the connector 3011 after transmitting the signal regarding the power transmission mode.

In an embodiment, when the external electronic device 101 receives the signal regarding the power transmission mode change from the electronic device 301, the external electronic device 101 may supply direct-current power (for example, 5 V) to the electronic device 301 through the connector 3011.

In an embodiment, in operation 809, under the control of the wireless power transmission/reception control circuit 312, the electronic device 301 may generate an electromagnetic field for wireless power transmission through the wireless power transmission/reception module 310, based on the received direct-current power.

In an embodiment, in operation 809, under the control of the wireless power transmission/reception control circuit 312, the electronic device 301 may convert the direct-current power received from the external electronic device 101 by using an inverter included in the wireless power transmission/reception module 310 to be transferred to another external electronic device (for example, a wireless power receptor) through the WPT coil 311.

In an embodiment, in operation 811, under the control of the wireless power transmission/reception control circuit 312, the electronic device 301 may determine whether the direct-current power reception is ended.

In an embodiment, when the direct-current power reception is ended, the electronic device 301 may proceed from operation 811 to END operation, under the control of the wireless power transmission/reception control circuit 312.

In an embodiment, when the direct-current power reception is ended, the electronic device 301 may end wireless power transmission operation, under the control of the wireless power transmission/reception control circuit 312.

In an embodiment, when the direct-current power reception is not ended, the electronic device 301 may proceed from operation 811 to operation 809, under the control of the wireless power transmission/reception control circuit 312.

Figure 9:
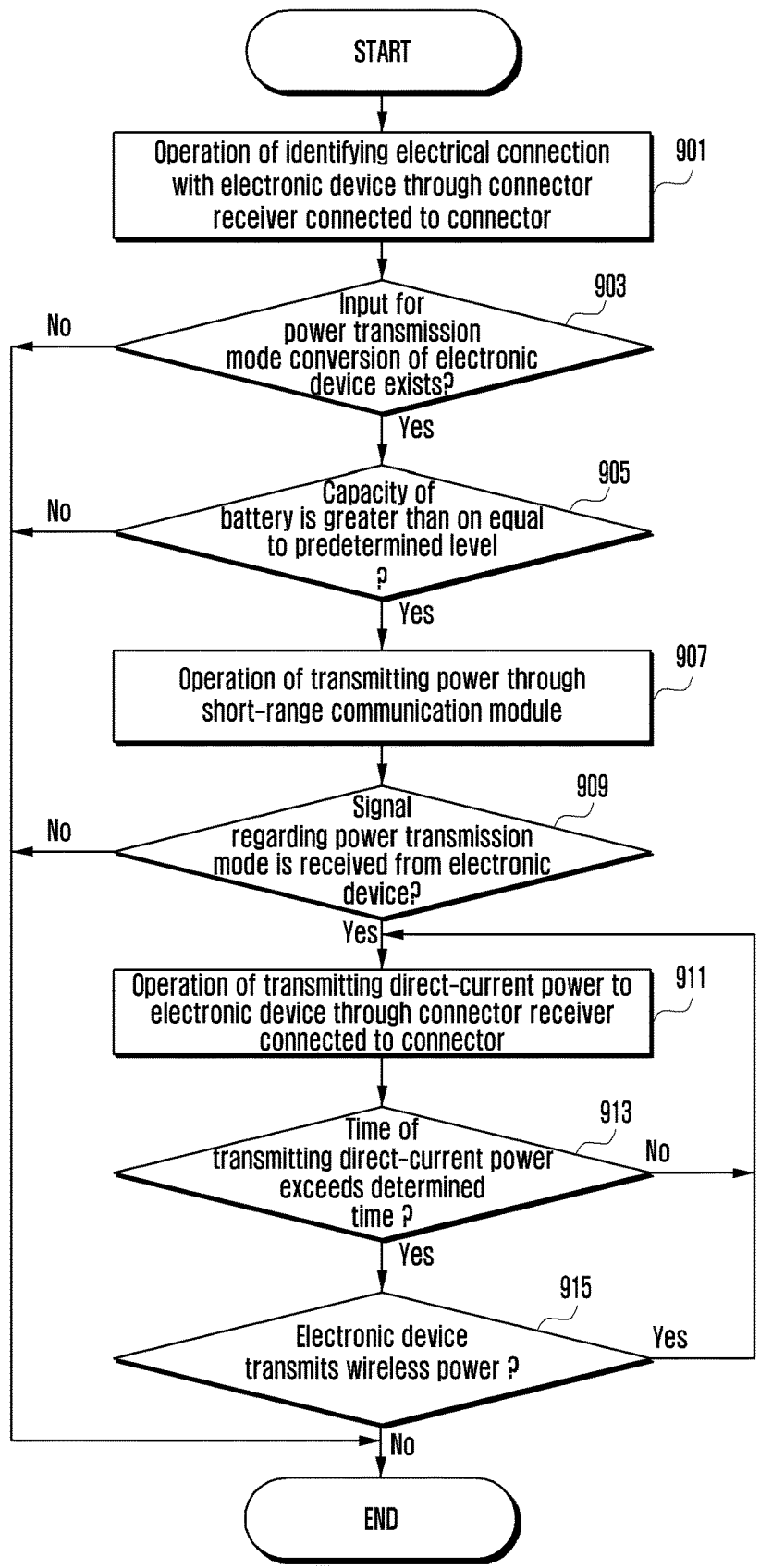
FIG. 9 is a flowchart illustrating a method for controlling an operation of an electronic device by an external electronic device according to an embodiment of the disclosure.

FIG. 9 is a flowchart illustrating a method for controlling an operation of an electronic device 301 by an external electronic device 101 according to an embodiment of the disclosure.

In an embodiment, in operation 901, under the control of the processor 120, the external electronic device 101 may confirm that it is electrically connected to the electronic device 301 through the connector receiver 1011 connected to the connector 3011. In an embodiment, in operation 901, under the control of the processor 120, it may be confirmed that the external electronic device 101 is electrically connected to the electronic device 301 via a wire. The processor 120 may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. In addition, it would be recognized that when a general purpose computer accesses code for implementing the processing shown herein, the execution of the code transforms the general purpose computer into a special purpose computer for executing the processing shown herein. Certain of the functions and steps provided in the Figures may be implemented in hardware, software or a combination of both and may be performed in whole or in part within the programmed instructions of a computer. No claim element herein is to be construed as means-plus-function, unless the element is expressly recited using the phrase "means for." In addition, an artisan understands and appreciates that a "processor" or "microprocessor" may be hardware in the claimed disclosure.

In an embodiment, it may be configured, as the default, that the external electronic device 101 receives power from the electronic device 301 through the connector 3011 and/or the connector receiver 1011 when electrically connected to the electronic device 301. The electronic device 301 may perform the operation of supplying or transferring the power received from an external wireless power transmitter to the external electronic device 101 through the connector 3011.

In an embodiment, when electrically connected to the electronic device 301, it may be configured, as the default, that the external electronic device 101 operates in the power reception mode in which power is received from the electronic device 301 through the connector 3011 and/or the connector receiver 1011.

In an embodiment, in operation 903, under the control of the processor 120, the external electronic device 101 may determine whether there is an input for power transmission mode conversion of the electronic device 301. In an embodiment, the external electronic device 101 may receive an input (e.g. user input) for power transmission mode conversion through an input module 150 or a touch sensor included in the display module 160.

In an embodiment, in operation 903, under the control of the processor 120, the external electronic device 101 may determine whether there is request for power transmission mode conversion of the electronic device 301.

In an embodiment, the request for changing the power transmission mode of the electronic device 301 may be, for example, a request for converting the power transmission mode by a user input. In an embodiment, the external electronic device 101 may display a user interface for power transmission mode conversion of the electronic device 301 on the display module 160. The external electronic device 101 may receive a user input (for example, touch input) for mode conversion on the user interface for power transmission mode conversion which is being displayed on the display module 160.

In an embodiment, under the control of the processor 120, the external electronic device 101 may proceed from operation 903 to operation 905 when there is an input for power transmission mode conversion of the electronic device 301.

In an embodiment, under the control of the processor 120, the external electronic device 101 may proceed from operation 903 to END operation when there is no input for power transmission mode conversion of the electronic device 301.

In an embodiment, in operation 905, under the control of the processor 120, the external electronic device 101 may determine whether the capacity of the battery 189 of the external electronic device 101 is greater than or equal to a predetermined level. In an embodiment, in operation 905, under the control of the processor 120, the external electronic device 101 may determine whether power stored in the battery 189 is greater than or equal to a predetermined level.

In an embodiment, when the power stored in the battery 189 is greater than or equal to a predetermined level, the external electronic device 101 may proceed from operation 905 to operation 907 under the control of the processor 120.

In an embodiment, when the power stored in the battery 189 is less than the predetermined level, the external electronic device 101 may proceed from operation 905 to END operation under the control of the processor 120.

In an embodiment, the predetermined level may be changed by user settings or set by a manufacturer. For example, the predetermined level may be a percentage of the power currently stored in the battery 189, relative to the total capacity of the battery 189. For example, when the percentage is 30%, the battery 189 may be currently storing 30% of the power relative to the total capacity in the battery 189.

In an embodiment, in operation 907, under the control of the processor 120, the external electronic device 101 may transmit power through the short-range communication module. In an embodiment, in operation 907, under the control of the processor 120, the external electronic device 101 may transmit a signal regarding power transmission mode conversion to the electronic device 301 through the short-range communication module. In an embodiment, in operation 907, under the control of the processor 120, the external electronic device 101 may transmit the signal regarding power transmission mode conversion of the electronic device 301 to the electronic device 301 by using the signal line 4011.

For example, the signal line 4011 may be a data line 402 (for example, D+, D− data line defined in the Universal Serial Bus (USB) C-type interface) or an identification line 403 (for example, Universal Serial Bus (USB) identification line or configuration channel (CC) line of the USB C-type interface).

In an embodiment, the signal regarding power transmission mode conversion of the electronic device 301 may be a signal configured to indicate that the mode of the electronic device 301 is changed from the wireless power reception mode to the wireless power transmission mode.

In an embodiment, the signal regarding power transmission mode conversion may be a command or a power signal to cause the electronic device 301 to be converted into a wireless power transmission mode.

In an embodiment, in operation 909, under the control of the processor 120, the external electronic device 101 may determine whether the signal regarding power transmission mode is received from the electronic device 301.

In an embodiment, in operation 909, under the control of the processor 120, when the signal regarding power transmission mode is received from the electronic device 301, the external electronic device 101 may determine that the electronic device 301 is in the wireless power transmission mode. In operation 909, under the control of the processor 120, when the signal regarding power transmission mode is not received from the electronic device 301, the external electronic device 101 may determine that the mode of the electronic device 301 is not converted to the wireless power transmission mode.

In an embodiment, when the signal regarding a power transmission mode is received from the electronic device 301, the external electronic device 101 may proceed from operation 909 to operation 911, under the control of the processor 120. In an embodiment, when the signal regarding a power transmission mode is received from the electronic device 301, the external electronic device 101 may operate in the on-the-go (OTG) mode.

In an embodiment, when the signal regarding a power transmission mode is not received from the electronic device 301, the external electronic device 101 may proceed from operation 909 to END operation, under the control of the processor 120.

In an embodiment, when the signal regarding a power transmission mode is not received from the electronic device 301, the external electronic device 101 may operate in a mode in which the external electronic device receives power from the electronic device 301.

In an embodiment, in operation 911, under the control of the processor 120, the external electronic device 101 may supply direct-current power (for example, direct-current power of 5 V) to the electronic device 301 through the connector receiver 1011 connected to the connector 3011. In an embodiment, in operation 911, under the control of the processor 120, the external electronic device 101 may supply power to the electronic device 301 via a wire. The direct-current power (for example, direct-current power of 5 V) may be power stored in the battery 189.

In an embodiment, in operation 913, under the control of the processor 120, the external electronic device 101 may determine whether the time during which direct-current power (for example, direct-current power of 5 V) is supplied to the electronic device 301 exceeds a predetermined time or time interval. For example, the predetermined time interval may be 10 seconds.

In an embodiment, when the time during which direct-current power (for example, direct-current power of 5 V) is supplied to the electronic device 301 exceeds the predetermined time interval, the external electronic device 101 may proceed from operation 913 to operation 915, under the control of the processor 120.

When the time during which direct-current power (for example, direct-current power of 5 V) is supplied to the electronic device 301 does not exceed the predetermined time interval, the external electronic device 101 may proceed from operation 913 to operation 911, under the control of the processor 120.

In operation 915, under the control of the processor 120, the external electronic device 101 may determine whether the electronic device 301 transmits wireless power.

For example, when the electronic device 301 transmits wireless power, a signal indicating that the electronic device is in the wireless power transmission state may be transmitted to the external electronic device 101 through the connector 3011 and/or the signal line 4011.

In an embodiment, when the electronic device 301 does not transmit wireless power, the signal indicating that the electronic device is in the wireless power transmission state may not be transmitted to the external electronic device 101.

In an embodiment, under the control of the processor 120, the external electronic device 101 may determine whether the electronic device 301 transmits wireless power, based on the signal indicating that the electronic device is in the wireless power transmission state.

In an embodiment, under the control of the processor 120, the external electronic device 101 may determine that the electronic device 301 does not transmit wireless power when the signal indicating that the electronic device is in the wireless power transmission state is not received.

In an embodiment, in operation 915, under the control of the processor 120, the external electronic device 101 may determine whether the electronic device 301 transmits wireless power.

In an embodiment, in operation 915, under the control of the processor 120, the external electronic device 101 may determine whether the electronic device 301 operates in the wireless power transmission mode. In an embodiment, in operation 915, under the control of the processor 120, the external electronic device 101 may determine whether the electronic device 301 is transmitting the power received from the external electronic device 101 via a wire to another external device (for example, a wireless power reception device).

In an embodiment, when the electronic device 301 is transmitting the power received from the external electronic device 101 to another external device (for example, a wireless power reception device), the external electronic device 101 may proceed from operation 915 to operation 911, under the control of the processor 120.

When the electronic device 301 does not transmit the power received from the external electronic device 101 to another external electronic device (for example, a wireless power reception device), the external electronic device 101 may proceed from operation 915 to END operation, under the control of the processor 120.

When the electronic device 301 does not transmit the power received from the external electronic device 101 to another external electronic device (for example, a wireless power reception device), the external electronic device 101 may stop direct-current power transmission to the electronic device 301, under the control of the processor 120.

The electronic device according to various embodiments disclosed herein may be one of various types of electronic devices. The electronic devices may include, for example, a portable communication device (e.g., a smart phone), a computer device, a portable multimedia device, a portable medical device, a camera, a wearable device, or a home appliance. The electronic device according to embodiments of the disclosure is not limited to those described above.

It should be appreciated that various embodiments of the disclosure and the terms used therein are not intended to limit the technological features set forth herein to particular embodiments and include various changes, equivalents, or alternatives for a corresponding embodiment. With regard to the description of the drawings, similar reference numerals may be used to designate similar or relevant elements. A singular form of a noun corresponding to an item may include one or more of the items, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "a first", "a second", "the first", and "the second" may be used to simply distinguish a corresponding element from another, and does not limit the elements in other aspect (e.g., importance or order). It is to be understood that if an element (e.g., a first element) is referred to, with or without the term "operatively" or "communicatively", as "coupled with/to" or "connected with/to" another element (e.g., a second element), it means that the element may be coupled/connected with/to the other element directly (e.g., wiredly), wirelessly, or via a third element.

As used herein, the term "module" may include a unit implemented in hardware, software, or firmware, and may be interchangeably used with other terms, for example, "logic," "logic block," "component," or "circuit". The "module" may be a minimum unit of a single integrated component adapted to perform one or more functions, or a part thereof. For example, according to an embodiment, the "module" may be implemented in the form of an application-specific integrated circuit (ASIC).

Various embodiments as set forth herein may be implemented as software (e.g., the program 140) including one or more instructions that are stored in a storage medium (e.g., the internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each element (e.g., a module or a program) of the above-described elements may include a single entity or multiple entities, and some of the multiple entities may be separately disposed in any other element. According to various embodiments, one or more of the above-described elements may be omitted, or one or more other elements may be added. Alternatively or additionally, a plurality of elements (e.g., modules or programs) may be integrated into a single element. In such a case, according to various embodiments, the integrated element may still perform one or more functions of each of the plurality of elements in the same or similar manner as they are performed by a corresponding one of the plurality of elements before the integration. According to various embodiments, operations performed by the module, the program, or another element may be carried out sequentially, in parallel, repeatedly, or heuristically, or one or more of the operations may be executed in a different order or omitted, or one or more other operations may be added.

Certain of the above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein.

While the present disclosure has been shown and described with reference to various embodiments thereof, it will be understood by those skilled in the art that various changes in form and details may be made therein without departing from the present disclosure as defined by the appended claims and their equivalents.

What is claimed is:

1. A method for controlling an electronic device electrically couplable to an external electronic device through a connector and capable of transmitting/receiving wireless power, the method comprising:
   identifying electrical connection to the external electronic device;
   receiving power from the external electronic device through a short-range communication module;
   activating a control circuit based on the received power;
   controlling, by the activated control circuit, a mode switch module to notify the external electronic device to supply power through the connector;
   receiving direct-current power from the external electronic device through the connector after controlling the mode switch module; and
   generating an electromagnetic field for wireless power transmission through a wireless power transmission/reception module, based on the received direct-current power.

2. The method of claim 1, further comprising:
   when a mode conversion signal is received from the external electronic device through the short-range communication module or a signal line, controlling, by the activated control circuit. the mode switch module to notify the external electronic device to supply power through the connector.

3. The method of claim 1, further comprising:
   determining whether an operation of receiving the direct-current power from the external electronic device is ended.

4. The method of claim 3, further comprising:
   when the operation of receiving the direct-current power from the external electronic device is ended, ending the wireless power transmission.

5. The method of claim 3, further comprising:
   when the operation of receiving the direct-current power from the external electronic device is not ended, continuing receiving the direct-current power from the external electronic device through the connector.

6. An electronic device electrically couplable to an external electronic device through a connector and capable of transmitting/receiving wireless power, the electronic device comprising:
   a shielding pad;
   a wireless power transmission/reception module;
   a short-range communication module;
   a first antenna of the wireless power transmission/reception module, the first antenna being disposed on a first surface of the shielding pad;
   a second antenna of the short-range communication module, the second antenna being disposed on a second surface of the shielding pad; and
   a mode switch module,
   wherein the wireless power transmission/reception module is electrically connected to the short-range communication module, the mode switch module, and the external electronic device, and comprises:
   the first antenna; and
   a wireless power transmission/reception control circuit, and wherein the wireless power transmission/reception control circuit is configured to:
      identify electrical connection with the external electronic device, receive power from the external electronic device through the short-range communication module,
   activate a control circuit based on the received power,
      control, by the activated control circuit, the mode switch module to notify the external electronic device to supply through the connector,
      receive direct-current power from the external electronic device through the connector after controlling the mode switch module, and
      generate an electromagnetic field for wireless power transmission through the wireless power transmission/reception module, based on the received direct-current power.

7. The electronic device of claim 6, wherein the wireless power transmission/reception control circuit is configured to:
  control, by the activated control circuit. the mode switch module to notify the external electronic device to supply power through the connector when a mode conversion signal is received from the external electronic device through the short-range communication module or a signal line.

8. The electronic device of claim 6, wherein the wireless power transmission/reception control circuit is configured to:
  determine whether an operation of receiving the direct-current power from the external electronic device is ended.

9. The electronic device of claim 8, wherein the wireless power transmission/reception control circuit is configured to:
  end the wireless power transmission when the operation of receiving the direct-current power from the external electronic device is ended.

10. The electronic device of claim 8, wherein the wireless power transmission/reception control circuit is configured to:
  continue to receive the direct-current power from the external electronic device through the connector when the operation of receiving the direct-current power from the external electronic device is not ended.

11. A method for controlling an external electronic device of an electronic device electrically couplable to the external electronic device through a connector, the external electronic device capable of transmitting/receiving power wirelessly, the method comprising:
  identifying electrical connection with the external electronic device through a connector receiver connected to the connector;
  receiving an input for power transmission mode conversion of the external electronic device;
  when receiving the input for power transmission mode conversion, determining whether battery capacity is greater than or equal to a predetermined level;
  when the battery capacity is greater than or equal to a predetermined level, transmitting a mode conversion signal to the external electronic device through a short-range communication module;
  when a notification regarding a power transmission is received, transmitting direct-current power to the external electronic device through the connector receiver connected to the connector;
  determining whether a time period during which the direct-current power is transmitted to the external electronic device exceeds a predetermined time period;
  when the time period during which the direct-current power is transmitted to the external electronic device exceeds the predetermined time period, determining whether the external electronic device transmits wireless power; and
  when it is determined that the external electronic device transmits wireless power, continuing transmitting the direct-current power to the external electronic device.

12. The method of claim 11, further comprising:
  when the external electronic device is not transmitting the wireless power, stopping transmitting the direct-current power to the external electronic device.

13. The method of claim 11, further comprising:
  when the input for power transmission mode conversion of the external electronic device is not received, operating in a power reception mode in which power is received from the external electronic device.

14. The method of claim 11, further comprising:
  when the battery capacity is less than the predetermined level, operating in a power reception mode in which power is received from the external electronic device.

15. The method of claim 11, further comprising:
  when the time period during which the direct-current power is supplied to the external electronic device does not exceed the predetermined time period, continuing transmitting the direct-current power to the external electronic device.

16. An electronic device comprising:
  a battery;
  a short-range wireless communication module;
  a display module; and
  a processor,
  wherein the processor is configured to:
    identify electrical connection with an external electronic device through a connector receiver connected to a connector,
    receive an input for power transmission mode conversion of the external electronic device,
    determine whether battery capacity is greater than or equal to a predetermined level when the input for power transmission mode conversion is received,
    transmit a mode conversion signal to the external electronic device through a short-range communication module when the battery capacity is greater than or equal to the predetermined level,
    transmit direct-current power to the external electronic device through the connector receiver connected to the connector when a notification regarding a power transmission is received,
    determine whether a time period during which direct-current power is transmitted to the external electronic device exceeds a predetermined time period,
    determine whether the external electronic device transmits wireless power when the time period during which the direct-current power is transmitted to the external electronic device exceeds the predetermined time period, and
    continue to transmit the direct-current power to the external electronic device when it is determined that the external electronic device transmits wireless power.

17. The electronic device of claim 16, wherein the processor is configured to:
  stop transmission of the direct-current power to the external electronic device when the electronic device is not transmitting the wireless power.

18. The electronic device of claim 16, wherein the processor is configured to:
  control to operate in a power reception mode in which power is received from the external electronic device when the input for power transmission mode conversion of the external electronic device is not received.

19. The electronic device of claim 16, wherein the processor is configured to:
  control to operate in a power reception mode in which power is received from the external electronic device when the battery capacity is less than the predetermined level.

20. The electronic device of claim 16, wherein the processor is configured to:
  continue to transmit the direct-current power to the external electronic device when the time period during which the direct-current power is supplied to the external electronic device does not exceed the predetermined time period.

21. A method for controlling an electronic device electrically couplable to an external electronic device through a connector and capable of transmitting/receiving wireless power, the method comprising:
- identifying electrical connection to the external electronic device;
- receiving power and a mode conversion signal from the external electronic device through a short-range communication module or the connector;
- activating a control circuit using the received power;
  - in response to receiving the mode conversion signal. controlling, by the activated control circuit, a mode switch module to notify the external electronic device to supply power through the connector;
- receiving direct-current power from the external electronic device through the connector after controlling the mode switch module; and
- generating an electromagnetic field for wireless power transmission through a wireless power transmission/reception module. based on the received direct-current power.

* * * * *